United States Patent
Lin et al.

(10) Patent No.: US 9,819,560 B2
(45) Date of Patent: Nov. 14, 2017

(54) DYNAMIC DATA DISTRIBUTION METHOD IN PRIVATE NETWORK AND ASSOCIATED ELECTRONIC DEVICE

(71) Applicant: MediaTek Inc., Hsin-Chu (TW)

(72) Inventors: Chi-Hsuan Lin, New Taipei (TW); Chih-Hsiang Hsiao, Taipei (TW); Po-Yu Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 119 days.

(21) Appl. No.: 14/838,582

(22) Filed: Aug. 28, 2015

(65) Prior Publication Data

US 2016/0192120 A1   Jun. 30, 2016

Related U.S. Application Data

(60) Provisional application No. 62/096,739, filed on Dec. 24, 2014.

(51) Int. Cl.
*H04L 12/26* (2006.01)
*H04L 29/06* (2006.01)
(Continued)

(52) U.S. Cl.
CPC ........ *H04L 43/065* (2013.01); *H04L 67/1091* (2013.01); *H04L 67/42* (2013.01);
(Continued)

(58) Field of Classification Search
CPC .. H04L 43/065; H04L 67/1091; H04W 4/008; H04W 52/0209; H04W 52/0277;
(Continued)

(56) References Cited

U.S. PATENT DOCUMENTS 8,761,118 B2* 6/2014 Aibara ............... H04W 36/385
370/331
2004/0233881 A1* 11/2004 Kang ..................... H04L 45/00
370/338

(Continued)

FOREIGN PATENT DOCUMENTS

EP         2 782 397        9/2014
WO     WO 2015/127056      8/2015

OTHER PUBLICATIONS

Hemminki, S., et al.; "Poster Abstract: CoSense-A Collaborative Sensing Platform for Mobile Devices;" Nov. 2013; pp. 1-2.

*Primary Examiner* — Devan Sandiford
(74) *Attorney, Agent, or Firm* — McClure, Qualey & Rodack, LLP

(57) ABSTRACT

A dynamic data distribution method in a private network and an associated electronic device are provided. The private network includes: a first pairing connection between a first electronic device, a second electronic device, and a second pairing connection between the first electronic device and a third electronic device. The method includes the steps of: receiving sensor data from the second electronic device by the first electronic device; notifying the second electronic device to build a third pairing connection with the third electronic device according to a determination result between the first electronic device and the third electronic device; and terminating the first pairing connection and retrieving the sensor data from the second electronic device through the third electronic device by the first electronic device when the third pairing connection has been built.

21 Claims, 12 Drawing Sheets

(51) Int. Cl.
  *H04L 29/08* (2006.01)
  *H04W 4/00* (2009.01)
  *H04W 52/02* (2009.01)
  *H04W 76/02* (2009.01)

(52) U.S. Cl.
  CPC ....... *H04W 4/008* (2013.01); *H04W 52/0209* (2013.01); *H04W 76/023* (2013.01); *Y02B 60/50* (2013.01)

(58) Field of Classification Search
  CPC ............. H04W 76/023; H04W 52/028; H04W 76/045; G01C 22/006; G06F 1/163; G06F 1/3215; G06F 1/3234; G06F 1/325; G06F 1/3287; Y02B 60/129
  See application file for complete search history.

(56) References Cited

U.S. PATENT DOCUMENTS

| | | | |
|---|---|---|---|
| 2006/0025118 A1 | 2/2006 | Chitrapu | |
| 2006/0215588 A1* | 9/2006 | Yoon | H04W 40/10 370/310 |
| 2007/0239862 A1* | 10/2007 | Bronez | H04L 12/24 709/223 |
| 2009/0010189 A1* | 1/2009 | Nagra | H04W 40/10 370/311 |
| 2010/0115096 A1 | 5/2010 | Eruchimovitch et al. | |
| 2010/0150122 A1* | 6/2010 | Berger | H04W 4/02 370/338 |
| 2010/0157821 A1* | 6/2010 | Morris | H04L 45/00 370/252 |
| 2011/0053493 A1* | 3/2011 | Yanagihara | H04W 84/20 455/7 |
| 2011/0176416 A1* | 7/2011 | Bhatti | H04N 7/18 370/230 |
| 2013/0322267 A1* | 12/2013 | Edara | H04B 7/063 370/252 |
| 2014/0045541 A1* | 2/2014 | Moshfeghi | H04W 84/00 455/500 |
| 2014/0126543 A1 | 5/2014 | Yao et al. | |
| 2014/0286322 A1 | 9/2014 | Ye | |
| 2014/0295913 A1 | 10/2014 | Gupta | |
| 2015/0162994 A1* | 6/2015 | Rodzevski | G07C 9/00309 455/39 |
| 2015/0350766 A1* | 12/2015 | Schobel | H04R 1/1091 381/77 |
| 2016/0018879 A1* | 1/2016 | Hsiao | H04W 52/0277 713/324 |
| 2016/0021617 A1* | 1/2016 | Hsiao | H04W 52/0277 455/456.6 |
| 2016/0050114 A1* | 2/2016 | John Archibald | G06F 1/3206 370/254 |
| 2016/0105924 A1* | 4/2016 | Baek | H04W 4/008 455/41.2 |
| 2016/0127559 A1* | 5/2016 | Baek | G06F 21/35 455/417 |
| 2016/0242025 A1* | 8/2016 | Aliyar | H04W 12/04 |
| 2016/0249295 A1* | 8/2016 | Nakao | H04W 4/005 |
| 2016/0277948 A1* | 9/2016 | Yeo | H04W 24/04 |
| 2016/0295622 A1* | 10/2016 | Huang | H04W 4/008 |
| 2016/0366695 A1* | 12/2016 | Ban | H04J 3/14 |

* cited by examiner

DYNAMIC DATA DISTRIBUTION METHOD IN PRIVATE NETWORK AND ASSOCIATED ELECTRONIC DEVICE

CROSS REFERENCE TO RELATED APPLICATIONS

This application claims the benefit of U.S. Provisional Application No. 62/096,739, filed on Dec. 24, 2014, the entirety of which is incorporated by reference herein.

BACKGROUND OF THE INVENTION

Field of the Invention

The invention relates to an electronic device, and, in particular, to a dynamic data distribution method in a private network and an associated electronic device.

Description of the Related Art

With recent advances in technology, portable devices have become more and more popular. Currently, a portable device may have at least one connectivity technology, e.g. Bluetooth, Wifi, etc., to connect to other electronic devices, thereby forming a network. However, if a user wants to obtain information about the services of other electronic devices in the network, he has to turn on many connectivity modules of his portable device for discovering services provided by other electronic devices, and it will quickly drain the battery power of his portable device. In addition, not all portable devices have rich connectivity technology for each service, and the number of connection channels is also limited. Thus, it will result in a poor user experience due to short battery life and limited services.

Accordingly, there is demand for a dynamic data distribution method in a private network and an associated electronic device to address the aforementioned issues.

BRIEF SUMMARY OF THE INVENTION

A detailed description is given in the following embodiments with reference to the accompanying drawings.

An electronic device is provided. The electronic device includes; a transceiver, for connecting the electronic device to a first external electronic device and a second external electronic device with a first pairing connection and a second pairing connection, wherein the electronic device, the first external electronic device, and the second external electronic device are in a private network; and a processor, configured to receive sensor data from the first external electronic device via the transceiver. The processor notifies the first external electronic device to build a third pairing connection with the second external electronic device according to a determination result between the electronic device and the second external electronic device. When the third pairing connection has been built, the processor terminates the first pairing connection, and retrieves the sensor data from the first external electronic device through the second external electronic device.

A dynamic data distribution method in a private network is provided. The private network includes: a first pairing connection between a first electronic device, a second electronic device, and a second pairing connection between the first electronic device and a third electronic device. The method includes the steps of: receiving sensor data from the second electronic device by the first electronic device; notifying the second electronic device to build a third pairing connection with the third electronic device according to a determination result between the first electronic device and the third electronic device; and terminating the first pairing connection and retrieving the sensor data from the second electronic device through the third electronic device by the first electronic device when the third pairing connection has been built.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
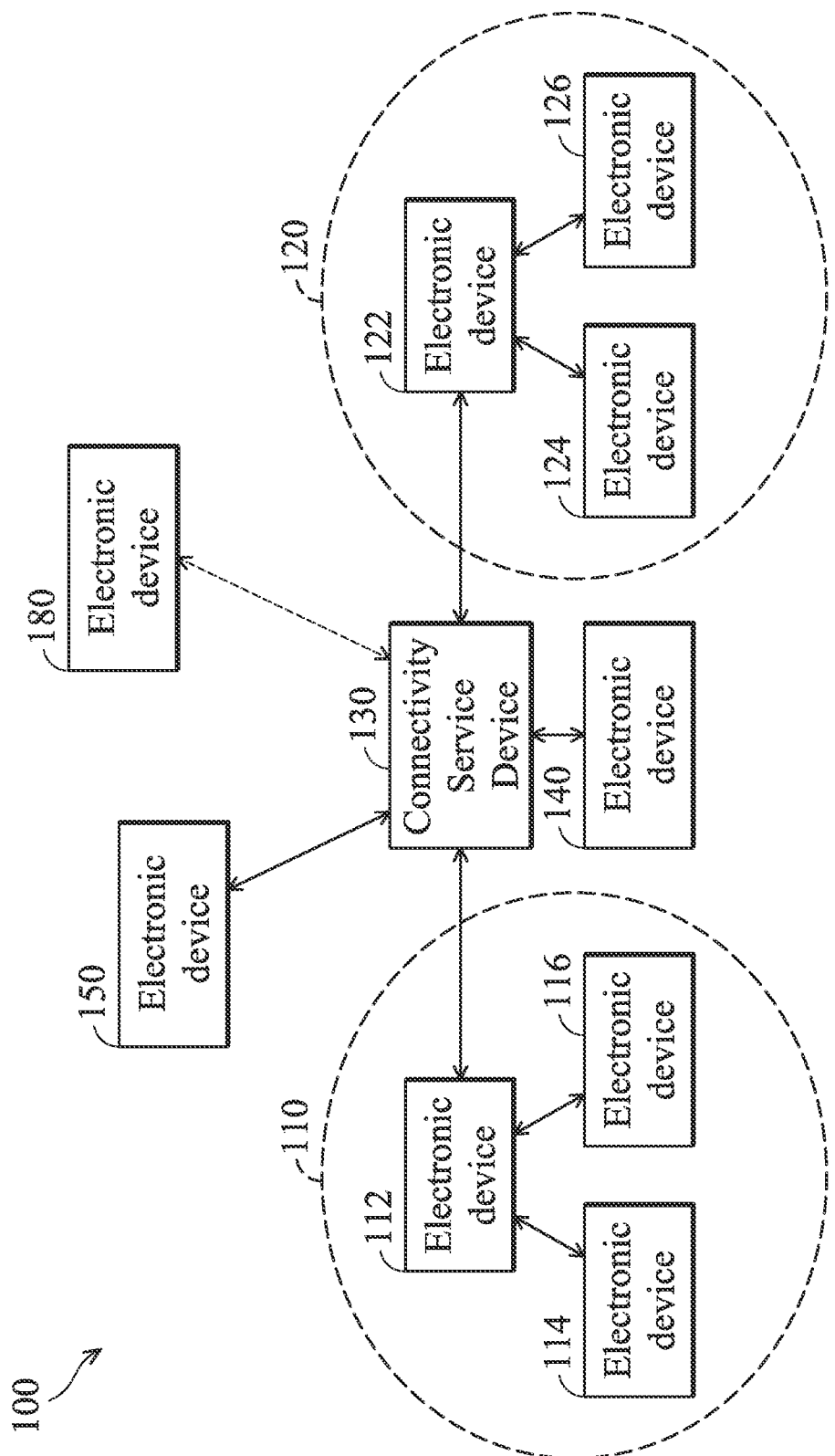
FIG. 1 is a diagram of an electronic system in accordance with an embodiment of the invention.

FIG. 1 is a diagram of an electronic system 100 in accordance with an embodiment of the invention. The electronic system 100 comprises one or more groups 110 and 120, at least one connectivity service device 130, and one or more electronic devices 140 and 150. For example, the connectivity service device 130 may be a smart hub or a smart access point which provide connectivity services to the electronic devices in the electronic system 100. Alternatively, the connectivity service device 130 may be a smartphone or a tablet PC.

Each group comprises a plurality of electronic devices. For example, the group 110 comprises electronic devices 112, 114, and 116, where the electronic devices 112, 114, and 116 are a smartphone, a smart watch, and a smart wristband, respectively. The electronic devices 114 and 116 are connected to the electronic device 112 using a wireless communication protocol such as Wifi or Bluetooth Low Energy (BLE), but the invention is not limited thereto. The group 110 is connected to the connectivity service device 130 via the electronic device 112. That is, the electronic devices 114 and 116 can indirectly access the network provided by the connectivity service device 130 via the electronic device 112.

Similarly, the group 120 comprises electronic devices 122, 124, and 126, where the electronic devices 122, 124, and 126 are a tablet PC, a smart wristband, and a smart watch, respectively. The electronic devices 124 and 126 are connected to the electronic device 122 using a wireless protocol such as Wifi or BLE, but the invention is not limited thereto. The group 120 is connected to the connectivity service device 130 via the electronic device 122. That is, the electronic devices 124 and 126 can indirectly access the network provided by the connectivity service device 130 via the electronic device 122.

For example, the electronic device 140 may be a smart TV, and the electronic device 150 may be a smart watch. The electronic devices 140 and 150 are directly connected to the connectivity service device 130 using a wireless communication protocol such as Wifi or BLE. It should be noted that the configuration of the electronic devices and the connectivity service device shown in FIG. 1 is an example used for ease of description. One having ordinary skill in the art will appreciate that the arrangement and the number of the electronic devices and the connectivity service device can be alternated according to practical situations.

In an embodiment, the connectivity service device 130 may build a service list including the electronic devices which are already connected to the connectivity service device 130. The service list also includes electronic devices capable of providing sensor services, such as radio frequency (RF) services (e.g. Wifi, LTE, Wireless USB, ZigBee, etc.), GPS service, NFC service, etc., but the invention is not limited thereto. When an electronic device 180, e.g. a portable device, enters the coverage region of the connectivity service device 130, the electronic device 180 may ask the connectivity service device 130 whether any service nearby is available via a low-power connection (e.g. BLE), and then the connectivity service device 130 may provide the service list to the electronic device 180. Thus, the electronic device 180 may select the most appropriate service from the services in the service list, and then connect to the electronic device associated with the selected service using the communication protocol compatible with the selected service.

Alternatively, the electronic device 180 may select the most appropriate service from the services in the service list, and exchange data with other electronic devices through the connectivity service device 130 using the selected service. Specifically, the electronic device 180 is connected to the connectivity service device 130 using a low-power communication protocol (e.g. BLE), and other electronic devices are connected to the connectivity service device 130 using a high-speed communication protocol, e.g. LTE, Wifi, or Zigbee. Thus, the electronic device 180 utilizes a low-power connection to retrieve RF data or sensor data with other electronic devices in the electronic system 100 through the connectivity service device 130, and the RF modules or sensors on the electronic device 180 can be turned off to reduce power consumption.

Figure 2:
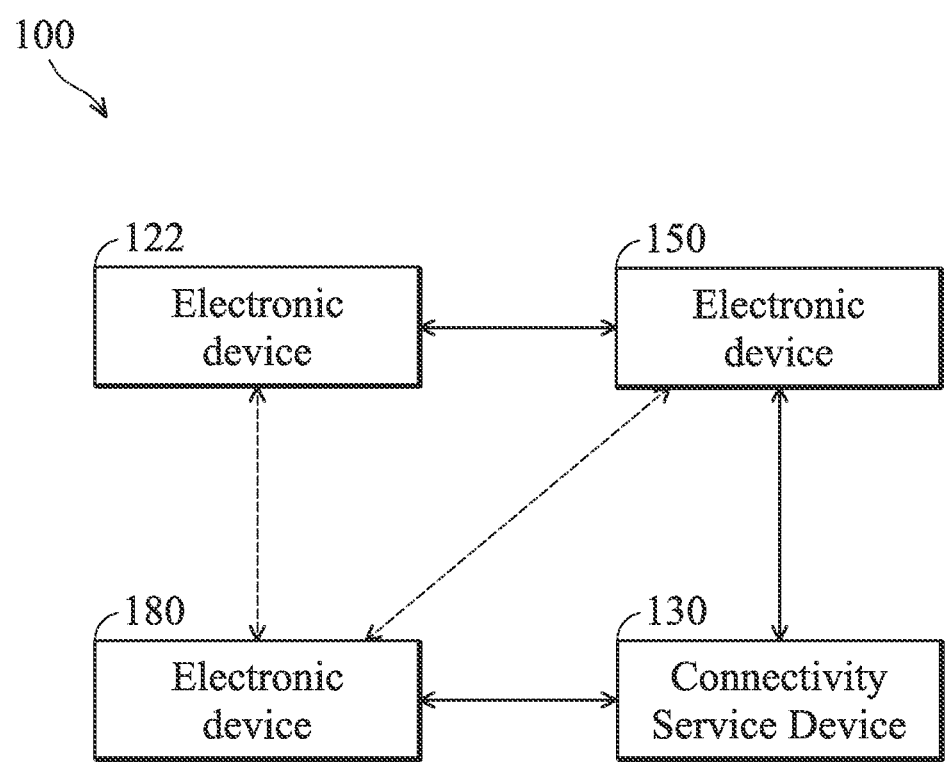
FIG. 2 is a diagram of the electronic system in accordance with another embodiment of the invention.

FIG. 2 is a diagram of the electronic system in accordance with another embodiment of the invention. In the first scenario, the connectivity service device 130 is a smartphone placed in a user's home, and the connectivity service device 130 may gather the services provided by other electronic devices and build a service list such as a Wifi service provided by the electronic devices 122 and 150. For example, the electronic device 122 is a tablet PC and the electronic device 150 is a smart TV, and the electronic device 122 is connected to the connectivity service device 130 through the electronic device 150. The electronic device 180 is a smart watch supporting BLE and Wifi protocols. When the user is wearing the electronic device 180 and going back to his home, the electronic device 180 may detect that the connectivity service device 130 is a service provider, and then the electronic device 180 may ask the connectivity service device 130 for the service list via a low-power connection (e.g. BLE), and thus the electronic device 180 may find that the electronic devices 122 and 150 providing the Wifi service are within the service list. Then, the electronic device 180 may turn on the Wifi module (not shown) and connect to the electronic devices 122 and 150 using the Wifi protocol. In other words, the electronic device 180 does not need to communicate with other electronic devices other than the connectivity service device 130 before retrieving the service list from the connectivity service device 130.

In the second scenario, referring to FIG. 1, the connectivity service device 130 gathers service information from other electronic devices which are connected to the connectivity service device 130, and the electronic device 180 has one or more wireless communication functions such as Wifi, Bluetooth, LTE, or ZigBee, etc., but the invention is not limited thereto. When the electronic device 180 enters the coverage region of the connectivity service device 130 of the electronic system 100, the electronic device 180 first asks the connectivity service device 130 whether any service nearby is available via a low-power connection, e.g. BLE, and then the connectivity service device 130 may provide the service list to the electronic device 180. Then, the electronic device 180 determines the most appropriate function to be used for direct communication with other electronic devices in the electronic system 100 according to the service list, and then the electronic device 180 may automatically turn on the most appropriate function and turn off other unselected functions, thereby reducing power consumption.

Figure 3:
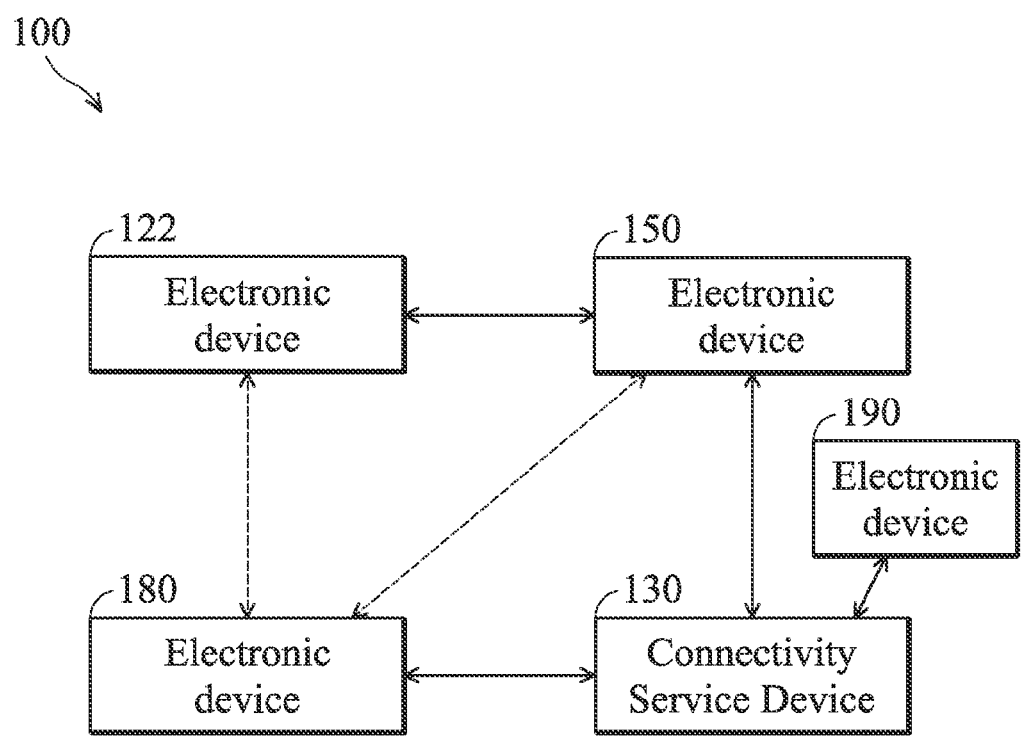
FIG. 3 is a diagram of the electronic system in accordance with yet another embodiment of the invention.

FIG. 3 is a diagram of the electronic system in accordance with yet another embodiment of the invention. In the third scenario, the connectivity service device 130 gathers service information from other electronic devices 122, 150, and 190 which are connected to the connectivity service device 130, and the electronic device 180 has one or more wireless communication functions such as Wifi, Bluetooth, LTE, or ZigBee, etc., but the invention is not limited thereto. For example, the electronic devices 122, 150, 180, and 190 are a tablet PC, a smart TV, a smart watch, and a smart wristband, respectively. When the user is wearing the electronic device 180 and entering the coverage region of the connectivity service device 130 of the electronic system 100, the electronic device 180 first asks the connectivity service device 130 whether any service nearby is available via a low-power connection, e.g. BLE, and then the connectivity service device 130 may provide the service list to the electronic device 180. The electronic device 180 determines the most appropriate wireless communication function, e.g. BLE or Wifi, according to the service list, and then exchanges required data with other electronic devices in the electronic system 100 through the connectivity service device 130 using the selected wireless communication function. Specifically, the electronic device 180 does not need to communicate with other electronic devices 122, 150, and 190 in the electronic system 100 before retrieving the service list from the connectivity service device 130. Data transmission between the electronic device 180 and the connectivity service device 130 is performed using a low-power communication protocol, e.g. BLE, and data transmission between the connectivity service device 130 and other electronic devices is performed using a high-speed communication protocol, e.g. LTE or Wifi. Accordingly, the power consumption of the electronic device 180 can be reduced in the third scenario.

Figure 4:
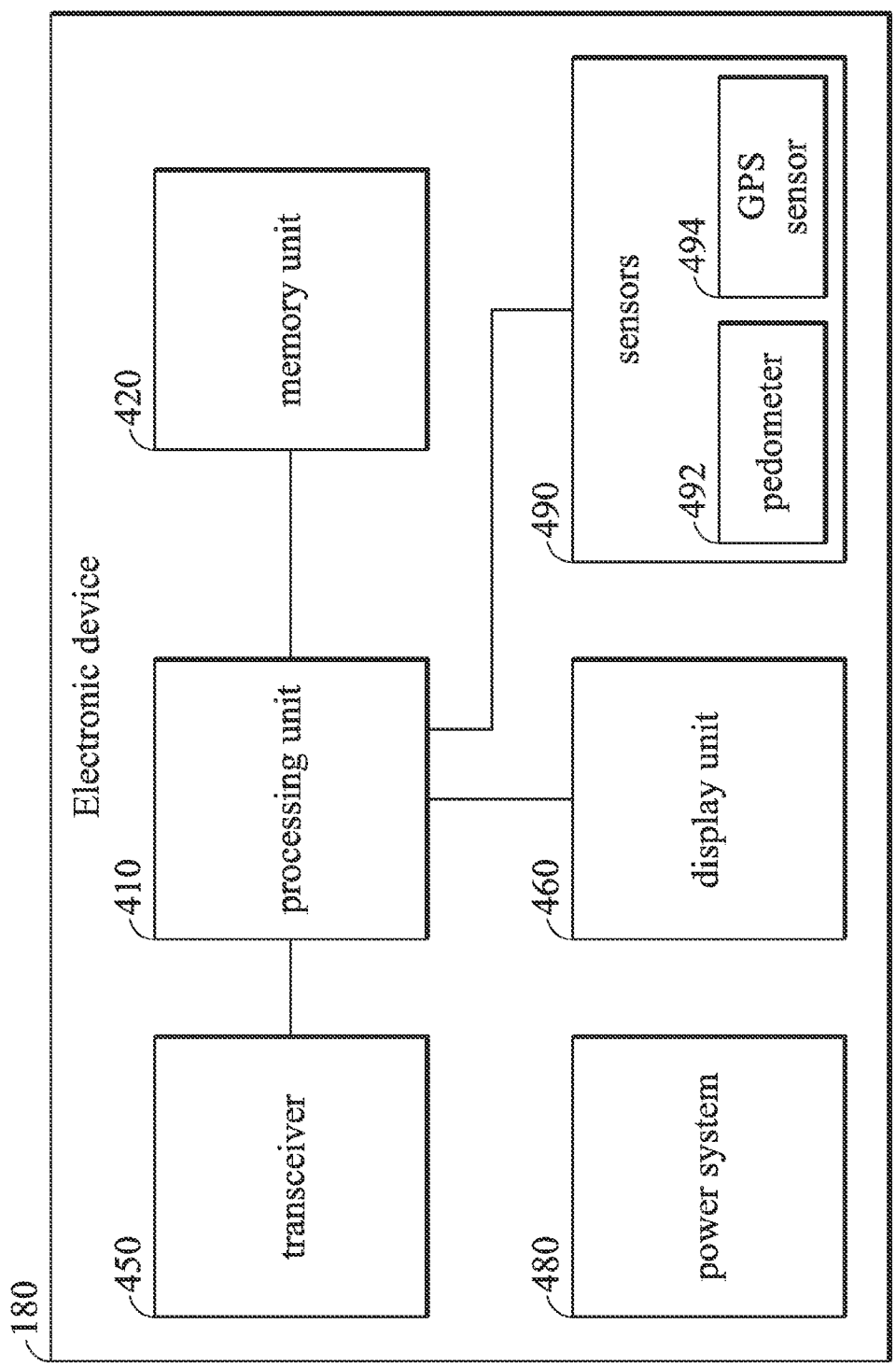
FIG. 4 is a block diagram illustrating the electronic device in accordance with an embodiment of the invention.

FIG. 4 is a block diagram illustrating the electronic device 180 in accordance with an embodiment of the invention. The electronic device 180 comprises a processing unit 410, a memory unit 420, a transceiver 450, a display unit 460, a power system 480 and one or more sensors 490. The processing unit 410 may include one or more processors and/or microcontrollers (MCU). The memory unit 420 may be applied as a main memory for the processing unit 410 for executing software routines and other selective storage functions. For example, the memory unit 420 may comprise a non-volatile memory and a volatile memory (not shown in FIG. 4). The non-volatile memory is capable of holding instructions and data without power and may store the software routines for controlling the electronic device 180 in the form of computer-readable program instructions. The non-volatile memory, e.g. flash memory, ROM, etc., may also contain a user interface application, which provides functionality for the electronic device 180 and can output a graphical user interface on the display unit 460, which may be a touch-sensitive display, i.e. a "touch screen".

The transceiver 450 is configured to connect the electronic device 180 to a remote electronic device via a wireless communication protocol, and transmitting/receiving packet data during the connection. For example, the BLE or NFC protocols are supported by the transceiver, but the invention is not limited thereto.

The power system 480 is configured to power the various components of the electronic device 180. The power system 480 may include a power management system, one or more power sources (e.g., battery, alternating current (AC), a recharging system, a power failure detection circuit, a power converter or inverter, a power status indicator, e.g. a light-emitting diode (LED), and any other components associated with the generation, management, and distribution of power in the electronic device 180.

The sensors 490, which may include a pedometer 492 and a global positioning system (GPS) sensor 494, couples to the processing unit 410. In an embodiment, the pedometer 492 is configured to count each step a person takes by detecting the motion of the person's hips, and the pedometer 492 may be implemented by using micro-electro mechanical system (MEMS) inertial sensors such as an accelerometer, a gyroscope, and/or a magnetometer (not shown).

Figure 5:
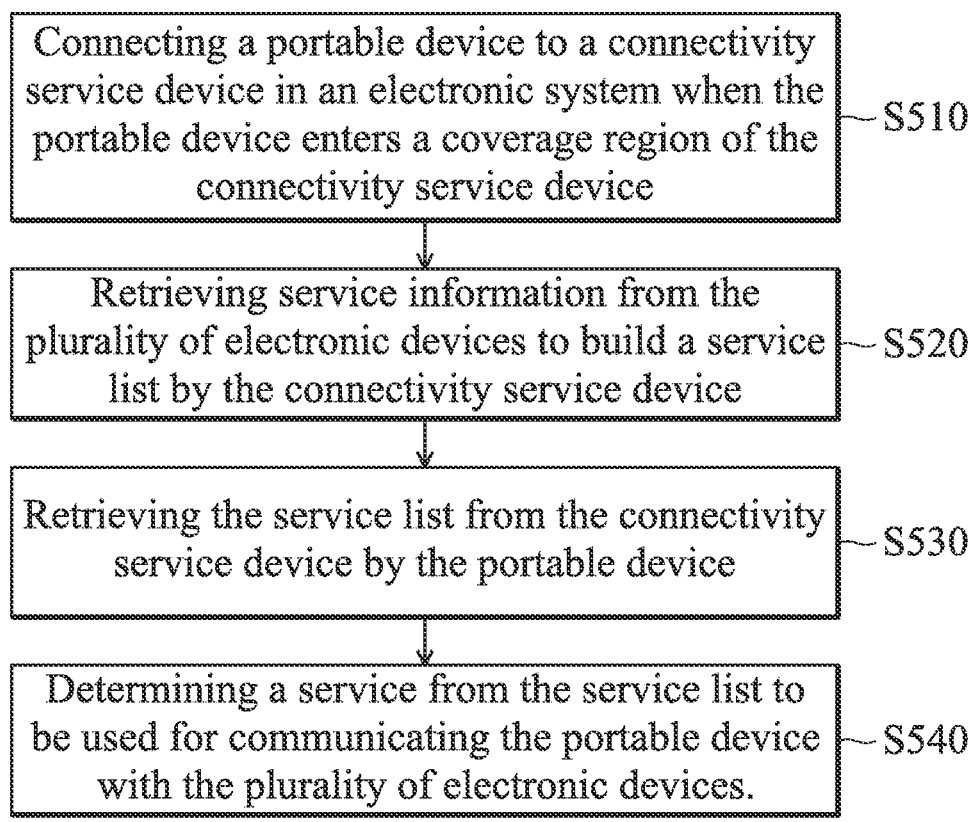
FIG. 5 is a flow chart of a method for accessing a network in an electronic system in accordance with an embodiment of the invention.

FIG. 5 is a flow chart of a method for accessing a network in an electronic system in accordance with an embodiment of the invention. In step S510, the electronic device 180 is connected to the connectivity service device 130 in the electronic system 100 when the electronic device 180 enters a coverage region of the connectivity service device 130. In step S520, the connectivity service device 130 retrieves service information from the electronic devices in the electronic system 100 to build a service list.

In step S530, the electronic device 180 retrieves the service list from the connectivity service device. In step S540, the electronic device 180 determines a service from the service list to be used for communicating the electronic device 180 with the plurality of electronic devices.

FIGS. 6A~6F are diagrams of an electronic system 600 in accordance with another embodiment of the invention. The electronic system 600 comprises electronic devices 610, 620, and 630. For example, the electronic devices 610, 620, and 630 are a smartphone, a smart watch, and a smart TV, respectively. A data consumer is an electronic device with sufficient computation ability, and it may "consume" data for applications. A data provider is capable of retrieving data from sensors and transmitting data to one or more data consumers. Specifically, the electronic devices 610 and 630 may be data consumers with different battery capacities, and the electronic device 620 may be a data provider. However, a smartphone and a smart TV are usually equipped with sensors, and thus the electronic devices 610 and 630 may also be data providers.

In an embodiment, the data consumers such as electronic devices 610 and 630 can discover each other via resource broadcasts using a short-range wireless communication protocol, e.g. BLE, Wifi, etc., and exchange requests and index information such as battery capacity, current load, link offloading . . . etc. In addition, the data consumers will also negotiate with each other and determine their relative roles, e.g. being a data provider or a data consumer, based on predetermined policies. The predetermined policies may be a policy to extend the battery life of all devices, a policy to extend the battery life of a specific device (i.e. priority based), or a policy to extend the data available time . . . etc., but the invention is not limited thereto.

Figure 6A:
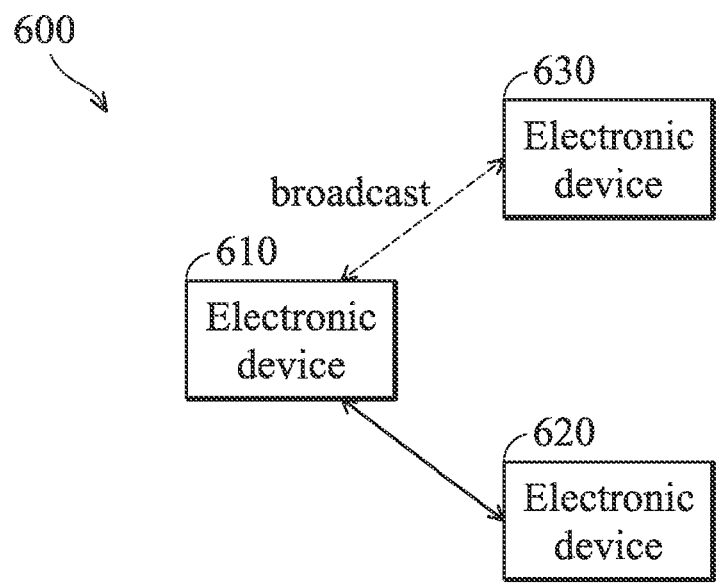
FIGS. 6A~6F are diagrams of an electronic system in accordance with another embodiment of the invention.
Figure 6B:
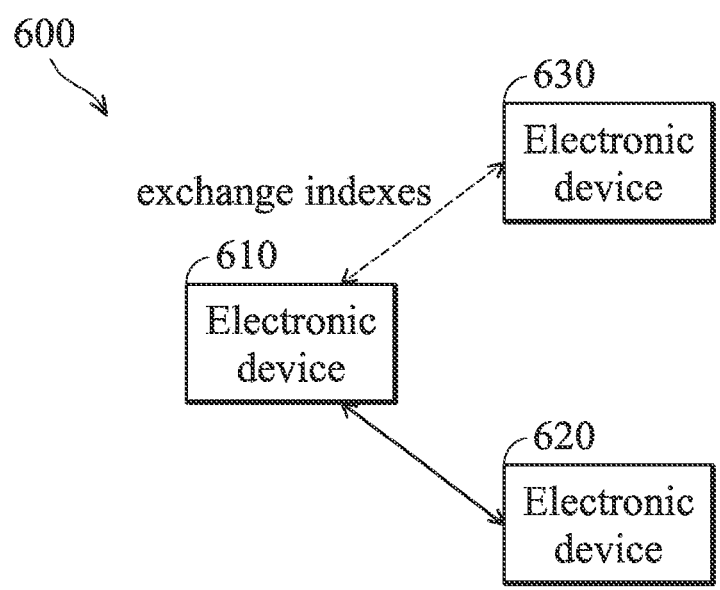
Figure 6C:
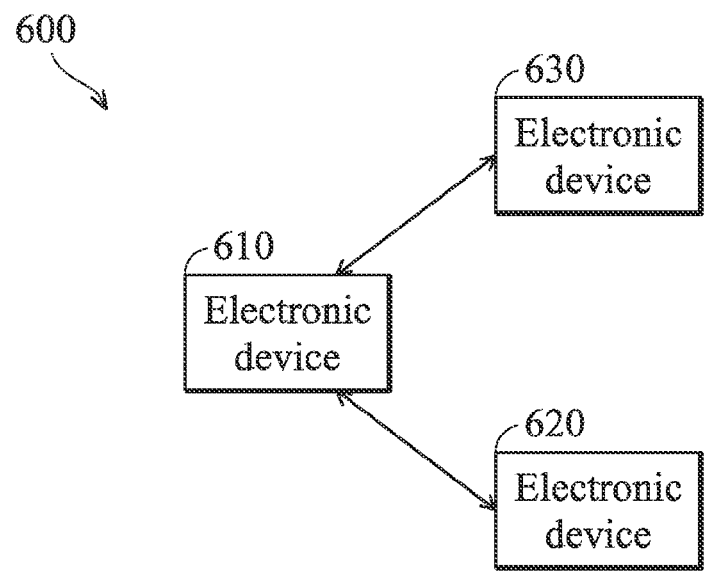

For example, referring to FIG. 6A, the electronic device 610 is connected to the electronic device 620, where the electronic device 610 is a data consumer and the electronic device 620 is a data provider. Meanwhile, the electronic devices 610 and 630 may discover each other via resource broadcasts. Then, the electronic devices 610 and 630 exchange index information with each other, as shown in FIG. 6B. After negotiation, the electronic devices 610 and 630 determine that the electronic device 610 is a data consumer and the electronic device 630 is a data provider, as shown in FIG. 6C. That is, the electronic devices 610 and 620 form a consumer/provider pair, and the electronic devices 610 and 630 form another consumer/provider pair. The electronic device 620 provides its sensor data to the electronic device 610, and the electronic device 630 provide its sensor data to the electronic device 610. The details for dynamic data distribution can be referred to in the embodiment of FIGS. 6D~6F.

Figure 6D:
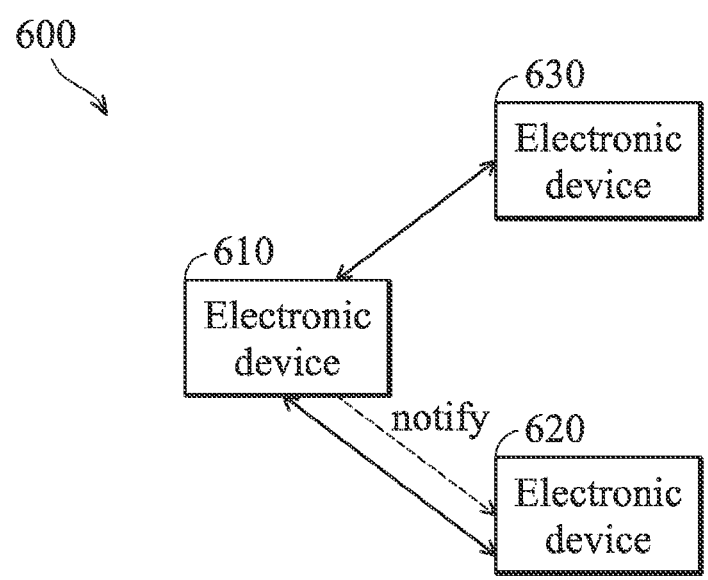
Figure 6E:
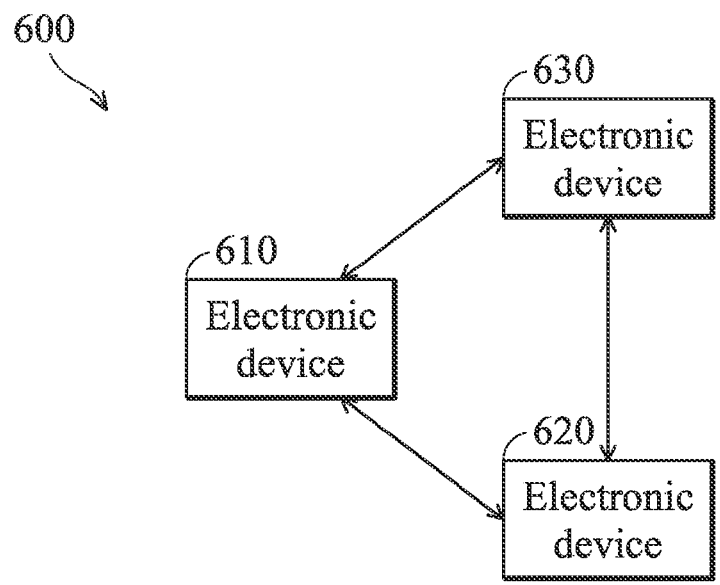
Figure 6F:
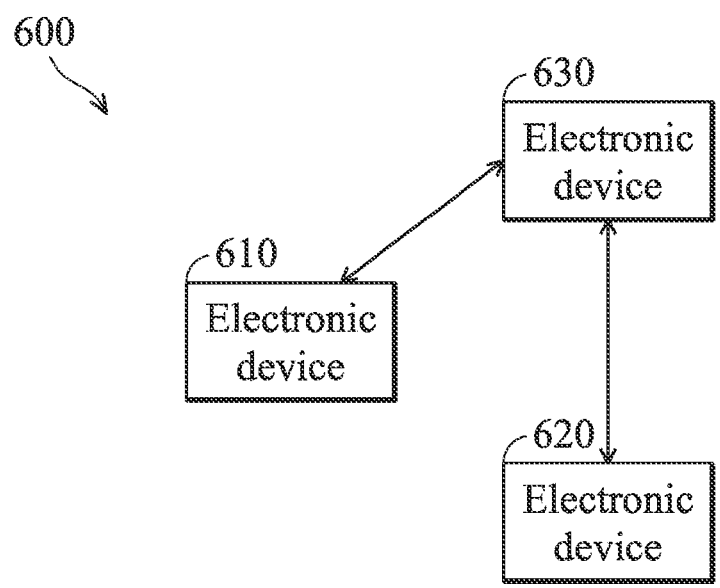

For example, the electronic device 610 may notify the electronic device 620 to build a new pairing connection with a new data consumer such as the electronic device 630, as shown in FIG. 6D. Then, the electronic device 620 may connect to the electronic device 630. Since the electronic device 620 is a resource-limited device, the electronic device 620 is determined as a data provider, and the electronic device 630 is a data consumer relative to the electronic device 620, as shown in FIG. 6E. Subsequently, once the pairing connection between the electronic devices 620 and 630 has been successfully built, the electronic device 610 may terminate the pairing connection with the electronic device 620, and the electronic device 620 will directly provide its sensor data to the electronic device 630. The electronic device 630 may forward the sensor data from the electronic device 620 to the electronic device 610. In this embodiment, the electronic device 630 is a data provider relative to the electronic device 610, and is also a data consumer relative to the electronic device 620.

For example, the electronic device 610 has limited battery capacity, but the electronic device 630 uses a household electricity supply. Preferably, the power consumption of the electronic device 610 should be reduced to extend the battery life. Accordingly, the electronic device 610 offloads the overhead of the connection and data retrieving with electronic device 620 to the battery-sufficient electronic device 630, thereby reducing the number of connections and the frequency for data access. In addition, after being connected, each consumer/provider pair exchanges information about constraints, such as fetch size, frequency, real-time, etc., and starts data transmission. For example, the electronic device 620 may transmit its sensor data to the electronic device 630 periodically, e.g. every 10 seconds. The electronic device 630 may buffer the sensor data from the electronic device 620, and the electronic device 610 may request the sensor data stored in the electronic device 630 periodically, e.g. every 60 seconds. Thus, the electronic device 610 may significantly reduce the frequency for accessing the sensor data, thereby reducing power consumption.

Figure 7A:
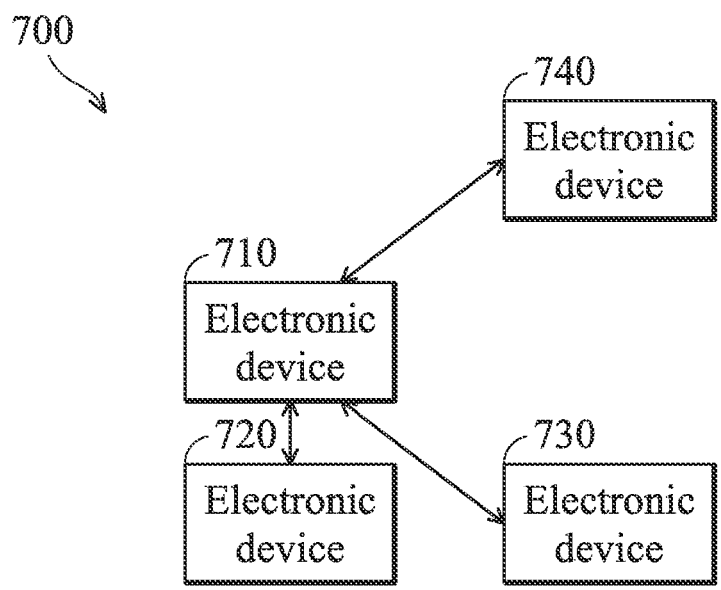
FIGS. 7A~7B are diagrams of the electronic system in accordance with yet another embodiment of the invention.
Figure 7B:
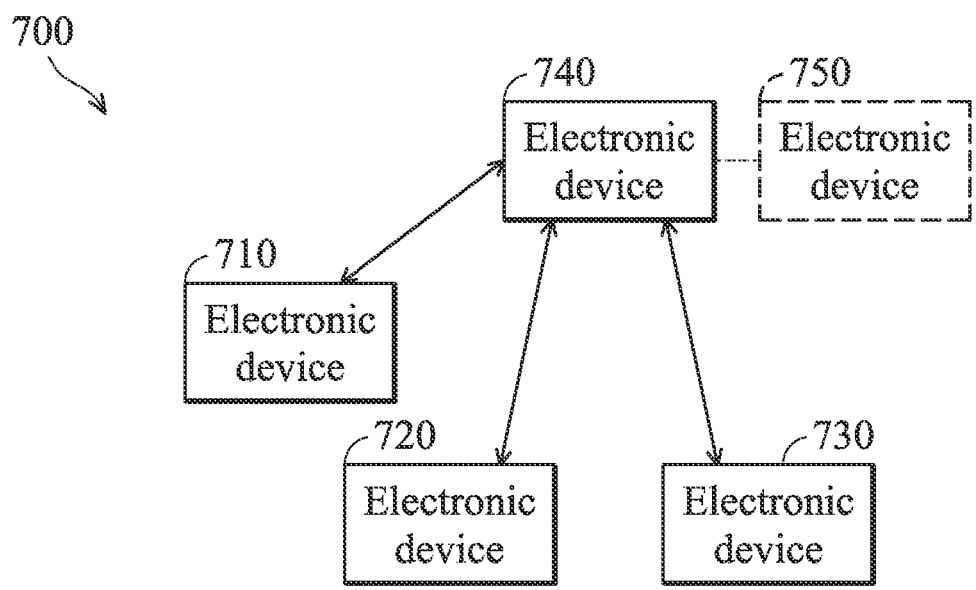

FIGS. 7A~7B are diagrams of the electronic system in accordance with yet another embodiment of the invention. The electronic system 700 comprises electronic devices 710~740. In a scenario, wherein the user is carrying the electronic devices 710, 720 and 730, the electronic device 710 (e.g. a smartphone) is connected to the electronic devices 720 and 730 such as a smart watch and a smart wristband, respectively. The electronic devices 720 and 730 are data providers and transmit their sensor data to the electronic device 710 periodically (e.g. every 10 seconds), where the electronic device 710 is a data consumer, as shown in FIG. 7A. When the user is entering his home, the electronic device 710 may discover the electronic device 740 (e.g. a smart TV) via broadcasts, where the electronic device 740 is also a data consumer. After negotiating with each other, the electronic devices 710 and 740 may know information (e.g. battery capacity, load, number of links, etc.) about each other and then determine that the electronic device 710 is a data provider and the electronic device 740 is a data consumer based on the policy of choosing the longest battery life. Specifically, the strategy for determining the data consumer or the data provider can be expressed by the function of battery capacity, load, or number of links, etc.

For example, the electronic device 710 has built a first pairing connection and a second pairing connection with the electronic devices 720 and 730, respectively. Since the electronic device 740 uses the household electricity supply, the battery life of the electronic device 740 is unlimited, and the electronic device 740 may perform most data accessing operations in the electronic system 700. For example, after determining that the electronic device 710 is a data provider and the electronic device 740 is a data consumer, the electronic device 710 notifies the electronic devices 720 and 730 to build a third pairing connection and a fourth pairing connection with the electronic device 740, respectively. After the electronic devices 720 and 730 have built the third pairing connection and the fourth pairing connection with the electronic device 740, the electronic device 710 terminates the first pairing connection and the second pairing connection with the electronic devices 720 and 730, and the electronic devices 720 and 730 send their sensor data directly to the electronic device 740, as shown in FIG. 7B. Thus, the number of connections for the electronic device 710 can be reduced to 1 from 2.

Furthermore, the electronic devices 720 and 730 send their sensor data directly to the electronic device 740 periodically, e.g. every 10 seconds. The electronic device 740 stores the sensor data from the electronic devices 720 and 730, and forwards the stored sensor data to the electronic device 710 periodically, e.g. every 60 seconds. In addition, as shown in FIG. 7B, the electronic device 740 may also build a pairing connection with another electronic device 750, e.g. a tablet PC, which is also a data consumer, and forward the stored sensor data to the electronic device 750 periodically, e.g. every 60 seconds.

Figure 7C:
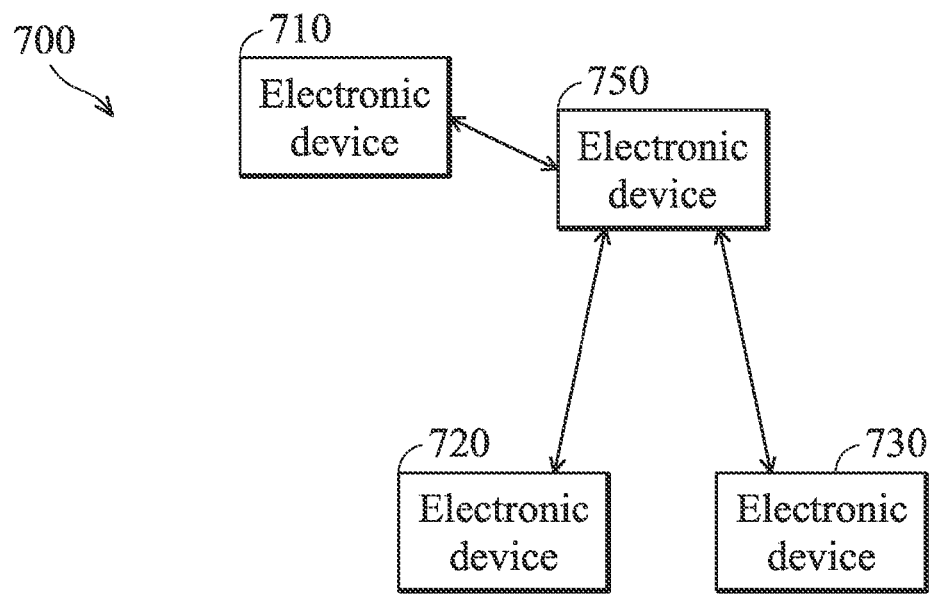
FIGS. 7C and 7D are diagrams of the electronic system in accordance with yet another embodiment of the invention.
Figure 7D:
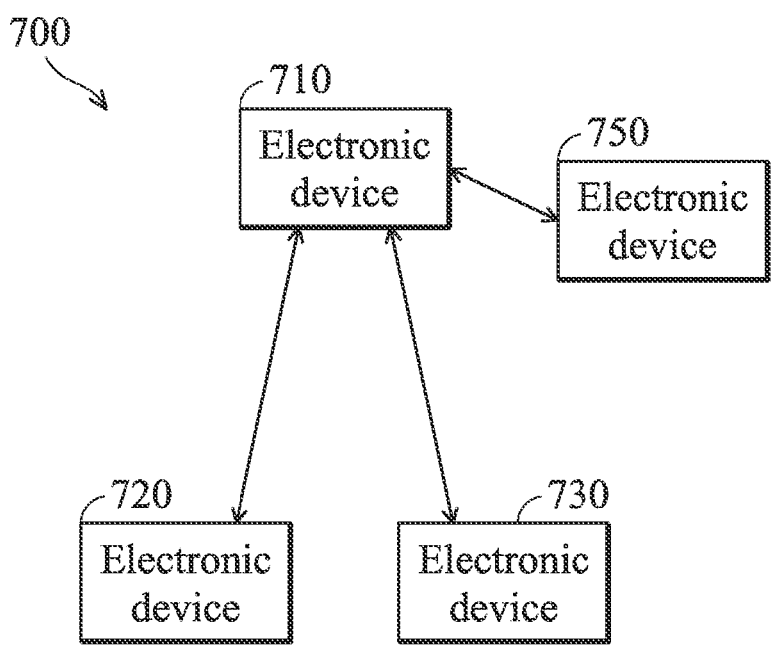

FIGS. 7C and 7D are diagrams of the electronic system in accordance with yet another embodiment of the invention. In another scenario, the user is carrying the electronic devices 710, 720, 730, and 750, and is going out for work. The electronic device 710 has built a first pairing connection with the electronic device 750, and the electronic devices 720 and 730 have also built a second pairing connection and a third pairing connection with the electronic device 750, as shown in FIG. 7C. The remaining battery life of the electronic device 710 and 750 is 1 day and 0.3 day, respectively. Thus, the battery life of the electronic device 750 should be extended as long as possible. Since the battery life of the electronic device 710 is more sufficient than that of the electronic device 750, the electronic device 710 should perform most data access operations. Specifically, the electronic device 750 notifies the electronic devices 720 and 730 to build a fourth pairing connection and a fifth pairing connection with a new data consumer such as the electronic device 710 when the remaining battery capacity (or the estimated remaining battery life) of the electronic device 750 is lower than a predetermined level. After the electronic devices 720 and 730 have built the fourth and fifth pairing connections with the electronic device 710, the electronic device 750 terminates the second and third pairing connection with the electronic devices 720 and 730, as shown in FIG. 7D. Then, the electronic devices 720 and 730 sends their sensor data directly to the electronic device 710, e.g. periodically, e.g. every 10 seconds, and the electronic device 710 buffers and forwards the sensor data to the electronic device 750 periodically, e.g. every 60 seconds. Accordingly, the number of connections of the electronic device 750 can be reduced to 1 from 3, and the polling frequency for the sensor data can also be reduced.

In another embodiment, the aforementioned method for offloading overhead to a new data consumer can be applied to a private network form by a data center or a network attached storage (NAS) and a plurality of communication devices, where the NAS is a data consumer and the communication devices are data providers. The NAS may offload all or a portion of the current links with the communication devices to another NAS, and the links among the NAS and the communication devices can be redistributed, and thus the total number of links can be reduced.

Figure 8:
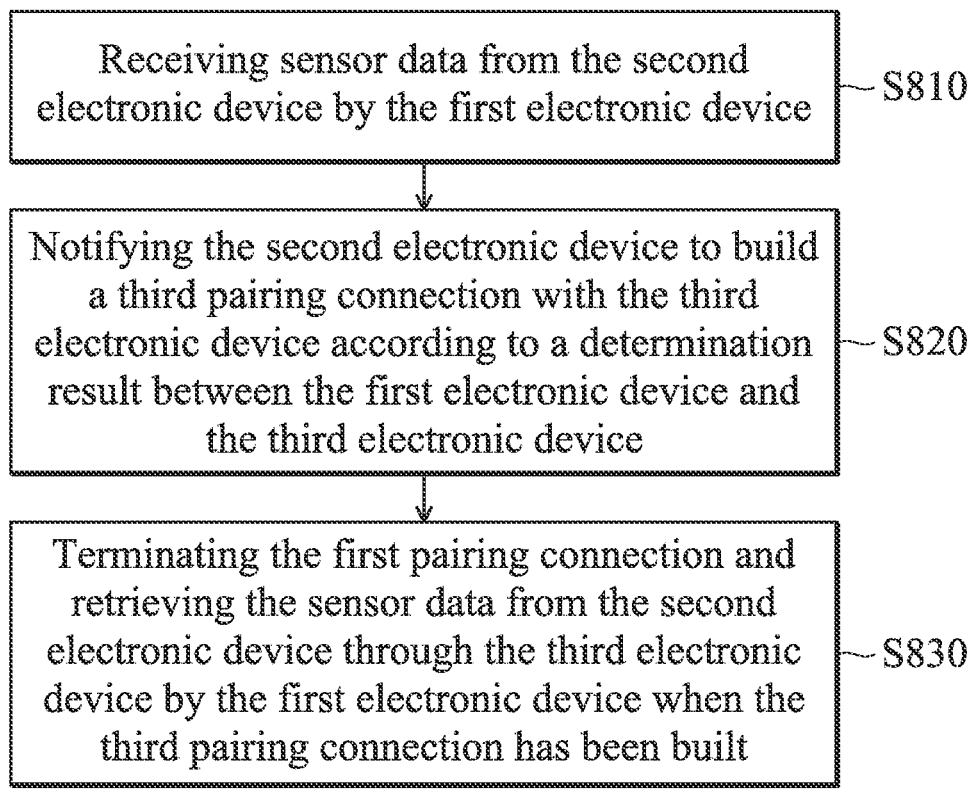
FIG. 8 is a flow chart of a dynamic data distribution method in a private network in accordance with an embodiment of the invention.

FIG. 8 is a flow chart of a dynamic data distribution method in a private network in accordance with an embodiment of the invention. The first electronic device has built a first paring connection and a second pairing connection with the second electronic device and the third electronic device, respectively. In step S810, the first electronic device (e.g. electronic device 610) receives sensor data from a second electronic device (e.g. electronic device 620). In step S820, the first electronic device notifies the second electronic device to build a third pairing connection with a third electronic device (e.g. electronic device 630) according to a determination result between the first electronic device and the third electronic device. In step S830, the first electronic device terminates the first pairing connection and retrieves the sensor data from the second electronic device through the third electronic device when the third pairing connection has been built.

Figure 9:
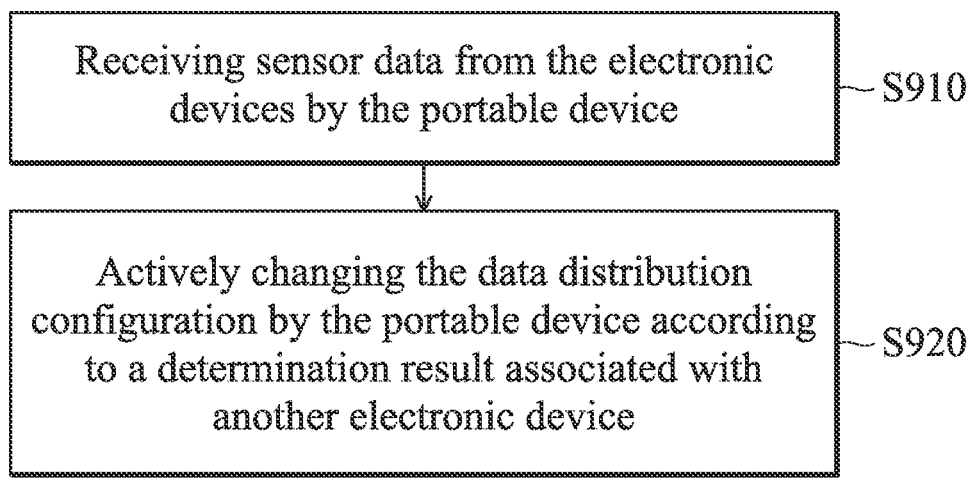
FIG. 9 is a flow chart of a dynamic data distribution method in a private network in accordance with another embodiment of the invention.

FIG. 9 is a flow chart of a dynamic data distribution method in a private network in accordance with another embodiment of the invention. In a scenario, a portable device has built connections with a plurality of electronic devices to form a private network, and the electronic devices communicate with the portable device through a data distribution configuration. For example, the data distribution configuration includes the relationship between the electronic devices and the portable devices such as data providers or data consumers. In step S910, sensor data from the electronic devices are received by the portable device. In step S920, the data distribution configuration is actively changed by the portable device according to a determination result associated with another electronic device. For example, the portable device may be a smartphone, and said another electronic device may be a tablet PC, a smart television, or a NAS, but the invention is not limited thereto.

Specifically, the portable device and the electronic devices may be carried by a user, and these devices may enter a coverage of said another electronic device. For example, when the portable device enters the coverage of said another electronic device, a network connection between the portable device and said another electronic device is established. As described in aforementioned embodiments, the determination result may be the relative roles of the portable device and said another electronic device in the established connection. For example, the portable device may be a data consumer, and the electronic device may be data providers in the private network formed by the portable device and the electronic devices. However, when the portable device has entered the coverage of said another electronic device, the portable device makes the determination result according to battery capacity, computation power, current load, or a remaining battery level of the portable device and the said another electronic device. Alternatively, the determination result may indicate that the portable device is under a low-power condition, or the portable device enters the coverage of said electronic device, or the remaining power of the portable device is under a predetermined threshold.

Thus, the portable device may be a data provider relative to said another electronic device as being a data consumer in an example, but the invention is not limited thereto. Accordingly, the portable device may notify the electronic devices to selectively build new network connections with said another electronic device according to the determination result associated with said another electronic device.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
    a transceiver, for connecting the electronic device to a first external electronic device and a second external electronic device with a first pairing connection and a second pairing connection, wherein the electronic device, the first external electronic device, and the second external electronic device are in a private network; and
    a processor, configured to receive sensor data from the first external electronic device via the transceiver,
    wherein the processor notifies the first external electronic device to build a third pairing connection with the second external electronic device according to a determination result associated with the second external electronic device,
    wherein when the third pairing connection has been built, the processor terminates the first pairing connection, and retrieves the sensor data from the first external electronic device through the second external electronic device.

2. The electronic device as claimed in claim 1, wherein the processor periodically receives the sensor data from the first external electronic device with the first connection using a first period.

3. The electronic device as claimed in claim 2, wherein the first external electronic device periodically sends the sensor data to the second external electronic device with the third connection using the first period, and the second external electronic device stores the sensor data from the first external electronic device.

4. The electronic device as claimed in claim 3, wherein the electronic device periodically retrieves the stored sensor data from the second external electronic device with the second connection using a second period, and the second period is longer than the first period.

5. The electronic device as claimed in claim 1, wherein the processor makes the determination result according to battery capacity, computation power, current load, or a remaining battery level of each of the electronic device and the second external electronic device.

6. The electronic device as claimed in claim 1, wherein the processor determines whether to terminate the first connection according to a plurality of predetermined policies.

7. The electronic device as claimed in claim 6, wherein the predetermined policies comprise a first policy to extend the battery life of the electronic device, the first external electronic device, and the second external electronic device, a second policy to extend the battery life of one of the electronic device, the first external electronic device, and the second external electronic device, and a third policy to extend the data available time.

8. The electronic device as claimed in claim 1, wherein the second external electronic device shares the sensor data from the first external electronic device with a third external electronic device with a fourth pairing connection.

9. A dynamic data distribution method in a private network, wherein the private network comprises a first pairing connection between a first electronic device and a second electronic device, and a second pairing connection between the first electronic device and a third electronic device, the method comprising:
    receiving sensor data from the second electronic device by the first electronic device;
    notifying the second electronic device to build a third pairing connection with the third electronic device according to a determination result between the first electronic device and the third electronic device; and
    terminating the first pairing connection and retrieving the sensor data from the second electronic device through the third electronic device by the first electronic device when the third pairing connection has been built.

10. The method as claimed in claim 9, further comprising:
    periodically receiving the sensor data from the second electronic device with the first connection by the first electronic device using a first period.

11. The method as claimed in claim 10, further comprising:
    periodically sending the sensor data to the third electronic device with the third connection by the second electronic device using the first period; and
    storing the sensor data from the second electronic device by the third electronic device.

12. The method as claimed in claim 11, further comprising:
periodically retrieving the stored sensor data from the third electronic device with the second connection by the first electronic device using a second period, wherein the second period is longer than the first period.

13. The method as claimed in claim 9, wherein the first electronic device makes the determination result according to battery capacity, computation power, current load, or a remaining battery level of each of the first electronic device and the third electronic device.

14. The method as claimed in claim 13, wherein the first electronic device determines whether to terminate the first connection according to a plurality of predetermined policies.

15. The method as claimed in claim 14, wherein the predetermined policies comprise a first policy to extend the battery life of the first electronic device, the second electronic device, and the third electronic device, a second policy to extend the battery life of one of the first electronic device, the second electronic device, and the third electronic device, and a third policy to extend the data available time.

16. The method as claimed in claim 14, wherein the third electronic device shares the sensor data from the second electronic device with a fourth electronic device with a fourth pairing connection.

17. A dynamic data distribution method in a private network, wherein the private network comprises a portable device and a plurality of electronic devices, the electronic devices communicate with the portable device through a data distribution configuration, the method comprising:
receiving sensor data from the electronic devices by the portable device; and
actively changing the data distribution configuration by the portable device according to a determination result associated with another electronic device,
wherein the actively changing step comprises:
establishing a network connection between the portable device and another electronic device when the portable device enters a coverage of said another electronic device;
utilizing the portable device to notify the electronic devices to selectively build new network connections with said another electronic device according to the determination result, so that the data distribution configuration is changed;
terminating a plurality of pairing connections associated with the original data distribution configuration between the electronic devices and the portable device; and
retrieving the sensor data from the electronic devices through the changed data distribution configuration by the portable device.

18. The method as claimed in claim 17, wherein the portable device is a smart phone, and said another electronic device is a tablet, a smart television, or a network attached storage.

19. The method as claimed in claim 17, wherein the determination result indicates that the portable device is under a low-power condition.

20. The method as claimed in claim 17, wherein the determination result indicates that the portable device enters a coverage of said another electronic device.

21. The method as claimed in claim 17, wherein the determination result indicates that a remaining power of the portable device is under a predetermined threshold.

* * * * *